United States Patent [19]

Mangold

[11] 4,274,118
[45] Jun. 16, 1981

[54] SYSTEM FOR THE RECORDING AND PLAY-BACK OF VIDEO SIGNALS

[75] Inventor: Hans Mangold, Fuerth, Fed. Rep. of Germany

[73] Assignee: Grundig E.M.V., Fed. Rep. of Germany

[21] Appl. No.: 65,875

[22] Filed: Aug. 13, 1979

[30] Foreign Application Priority Data

Feb. 11, 1979 [DE] Fed. Rep. of Germany ....... 2847550

[51] Int. Cl.³ .................... G11B 5/08; G11B 5/55; G11B 5/56; G11B 15/60
[52] U.S. Cl. ..................................... 360/84; 360/106; 360/109; 360/130.24
[58] Field of Search ................ 360/11, 33, 74.1, 74.4, 360/84, 106, 109, 130.24

[56] References Cited

U.S. PATENT DOCUMENTS

| | | | |
|---|---|---|---|
| 3,213,204 | 10/1965 | Okamura | 360/84 |
| 3,614,342 | 10/1971 | Siebert | 360/106 X |
| 4,156,258 | 5/1979 | Schoettle et al. | 360/106 X |

FOREIGN PATENT DOCUMENTS

| | | | |
|---|---|---|---|
| 2063257 | 7/1971 | Fed. Rep. of Germany | 360/84 |
| 4412664 | 7/1966 | Japan | 360/74.4 |
| 4539857 | 3/1967 | Japan | 360/74.4 |
| 905246 | 9/1962 | United Kingdom | 360/74.4 |

Primary Examiner—John H. Wolff
Assistant Examiner—Aristotelis M. Psitos
Attorney, Agent, or Firm—Gerald Levy

[57] ABSTRACT

A system is provided for increasing the recording/playback time for video tape devices. A tape is utilized on which signals are recorded in one direction for one half the tape width and in the opposite direction for the other half of the tape width. The tape drive mechanism automatically reverses at the end of feed in each direction and when the tape feed direction changes the relative vertical position of the tape head (or heads) with respect to the tape also changes.

5 Claims, 4 Drawing Figures

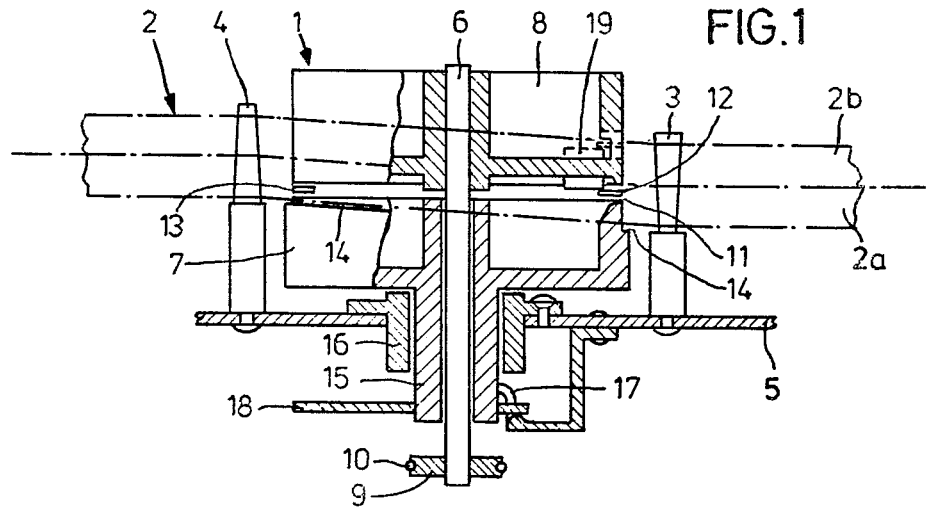
FIG.1
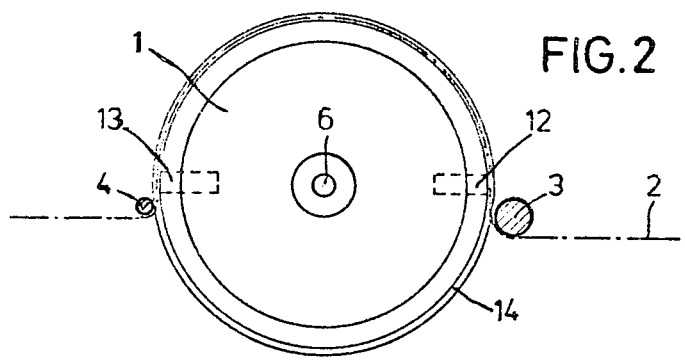
FIG.2
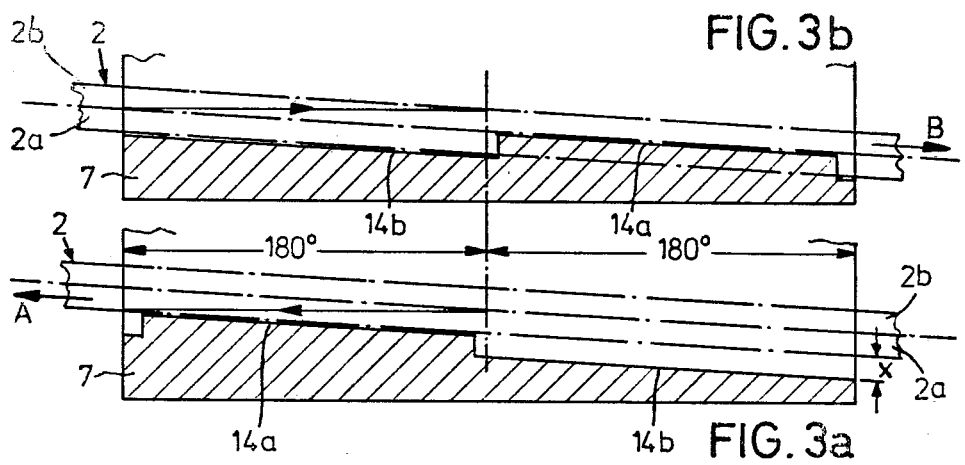
FIG.3b
FIG.3a

SYSTEM FOR THE RECORDING AND PLAY-BACK OF VIDEO SIGNALS

BACKGROUND OF THE INVENTION

The present invention relates to video tape recording and play-back and in particular to a system for increasing the recording/play-back time of video cassettes.

In video tape devices, as for example home recorders, for economic reasons, it is highly desirable to minimize the tape consumption rate. This is particularly so for the magnetic recording/play-back of color video signals. As a result, the tape advance speed has been reduced as much as is technically feasible and the magnetic surface of the tape is used extensively.

Such home video recorders are usually operated with tape cassettes. Accordingly, the dimensions of the cassette housing limit the available tape play time. It is desirable to keep the cassettes as compact as possible while maximizing the available play time of the tape cassette. Of the cassette dimensions, the cassette height (which is determined by the tape width) has little overall effect on the cassette compactness. Heretofore devices for the recording/play-back of slanted track video signals operated on tape cassettes in which the tape travelled operationally in one direction only and the tracks extended over substantially the entire top width.

In view of the above, it is the principle object of the present invention to provide a video tape recording/play-back system of the cassette type wherein the time capacity of the cassette is increased by substantially fifty percent without substantially changing the cassette dimensions and wherein the tape band width remains the same or is only slightly changed.

SUMMARY OF THE INVENTION

The above and other beneficial objects and advantages are attained in accordance with the present invention by providing a system wherein the tape cassette is fed first in one direction and then in the opposite direction. The direction of drive is automatically reversed at the end of travel in each direction.

The inclined track video signals are recorded/played-back on/from half the tape width for each direction of tape travel. Although the tape cassette could be turned over by hand after each direction of travel, such an arrangement would not permit automatic operation. Further, while mechanical turning devices may be feasible, such devices would increase the expense of the video recorder or play-back device and would require additional space. In view of this, the present invention further contemplates an arrangement whereby the head drum is shifted vertically (i.e., perpendicular to the direction of tape travel) with each reversal of the tape direction and is simultaneously rotated 180°. The sound head and erasure head are also shifted. Alternately, with each reversal of the tape direction the cassette support and tape spools may be shifted vertically. In both cases the vertical shifting is by an amount substantially equal to one half the tape width.

BRIEF DESCRIPTION OF THE DRAWINGS

In the accompanying drawings:

FIG. 1 is a simplified, fragmentary sectional view of the head drum of a device incorporating the present invention;

FIG. 2 is a top plan view of the device of FIG. 1; and,

FIG. 3a and FIG. 3b are schematic views of the winding of a tape feeding mechanism at the head drum.

DETAILED DESCRIPTION OF THE INVENTION

Reference is now made to the drawings and to FIG. 1 in particular wherein a video recorder head drum 1 for recording/play-back of inclined-track video signals is depicted along with a section of tape 2 and tape feed guide pins 3 and 4. To simplify and clarify the present description, the associated portions of the video recorder and cassette (i.e., cassette casing, capstan drive, head drum drive, audio-synchron head, erasure head, tape feed, tape spool drive, etc.) are not shown.

The head drum 1 is mounted on a chassis 5 and consists of two coaxial drum portions 7 and 8 each in the form of a hollow cylinder mounted on the common shaft 6. The lower cylinder 7 which is substantially stationary acts as a guide for the magnetic tape 2 and also serves as a bearing for shaft 6. The upper drum portion 8 is coupled to shaft 6 and is driven by the shaft. To this end, roller 9 is provided which is coupled through belt 10 with a drive motor (not shown). Video heads 12 and 13 are provided extending into slot 11 which is defined between the upper and lower drum portions 8 and 7. The video heads 12 and 13 are mounted below the rotating upper drum portion 8.

A tape feed support 14 for the magnetic tape 2 extends helically about the face of lower drum 7. The tape support may be coupled rigidly to the lower drum portion or may be vertically adjustable. A bearing neck 15 in the lower drum portion 16 serves to enable the head drum 1 to be plugged into guide jacket 16 which is provided in chassis 5. An adjustment cam 17 on the chassis cooperates with an adjustment lever 18 at the end of the bearing neck 15 to permit the lifting or lowering of head drum 1 and the simultaneous rotation of the lower drum portion 7 and thereby a vertical adjustment of the tape feeding means 14 during a circular movement of lever 18.

In accordance with the present invention, the recorded inclined track video signals extend along one half the width of magnetic tape 2 during each directional feed cycle. Thus, in FIG. 1 only the lower magnetic tape half 2a is recored or scanned as the tape feeds in a first direction. During the reverse movement of the tape the upper tape half 2b is recorded or scanned. To this end, the head drum 1 is lifted vertically by an amount equal to substantially one half the tape width and the tape feeding position is adjusted to the changed vertical position of the head drum by rotating the lower drum portion 180°. Simultaneously the audio or synchron track as well as the erasure head are adjusted vertically. To this end, the sound and erasure heads may be vertically adjustable or switchable between a plurality of heads located at the raised and lowered vertical positions.

Alternatively, a double head arrangement, electrically switchable, on the head drum may be utilized whereby the two separated video heads are offset from each other by one half the tape width. One example is shown in FIG. 1 wherein a second video head 19 (shown in phantom) is offset vertically from the first set of heads 12 or 13, by one half the tape width. Where a second head 19 is used, the need for mechanical vertical adjustment and pivoting is eliminated and replaced with switch means to select between the first set of heads 12 and 13 and the second head 19 upon reversal of the tape direction. Thus, when the tape moves in one direction the lower head 12 is activated (while head 19 is deactivated) and when the tape moves in the opposite direction head 19 is activated (and head 12 deactivated). The net result is that upon a reversal of the tape's direction the relative position of the active head with respect to the tape is shifted.

As a further alternative when the tape feed direction is changed the relative vertical position between the video head and tape may be adjusted by adjusting the tape rather than the head drum. This may be accomplished by adjusting the tape feed pins 3 and 4, feed support 14 and the cassette support (not shown) with each reversal of the tape direction.

In FIG. 2 the winding of magnetic tape 2 about the head drum 1 is shown. The video (and, if desired, sound and errasure) heads 12 and 13 are offset 180° with respect to each other. FIGS. 3a, and 3b depict the winding of the tape feeding means which extends about the face of the lower drum portion 7. The different vertical positions of the tape feeding means are shown. Thus, in accordance with FIG. 3a the lower half 2a of the magnetic tape is provided with a video signal on inclined tracks slanted so that they may be recorded or scanned as the tape moves in the direction of the arrow A and engages the tape feed support 14a. When the tape completes its travel in the direction A and is reversed, the head drum rotates 180° and the tape assumes the position in FIG. 3b. In the position of FIG. 3b the tape moves in the direction of the arrow B. The upper half 2b of the magnetic tape is provided with video signals tracks inclined to be recorded or scanned as the tape moves in the direction B and the tape is supported along surface 14b which is vertically offset from surface 14a by one half the tape width as shown in FIG. 3a. Simultaneously with the reversal of the tape direction the head drum is shifted vertically by one half the tape width.

Thus, in accordance with the above the aforementioned objectives are attained.

Having thus described the invention, what is claimed is:

1. In a system for the recording and playback of inclined track video signals wherein a length of magnetic tape is supported by guide means to extend partially about a head drum having at least one video head thereon, the improvement comprising:

said tape being divided longtiudinally with the slant tracks on one half the tape width being disposed to be recorded/played back when the tape is fed in one direction and the slant tracks on the other half of the tape width being disposed to be recorded/played back when the tape is fed in the opposite direction;

tape means for feeding said tape past said head and for automatically reversing the direction of feed of said tape when at least one end of said tape reached; and, means for changing the relative position of said video head with respect to said tape when said tape feed means reverses direction whereby said video head is in operative position for the inclined tracks on one half the tape width when the tape travels in one direction and said video head is in operative position for the inclined tracks in the other half of the tape width when the tape travels in the opposite direction, said position changing means including means for shifting said head drum in the direction perpendicular to the direction of travel of said tape and said head drum includes a first rotating portion supported on a second portion, said guide means includes a tape support extending helically about said second portion, and means for pivoting said second portion 180° each time said tape changes direction.

2. The system in accordance with claim 1 wherein said tape support is connected to said drum second portion.

3. The system in accordance with claims 1 or 2 wherein said tape support comprise two segments extending about said drum second portion vertically offset from each other by one half the width of said tape.

4. The system in accordance with claims 1 or 2 further including means for simultaneously shifting said video head with respect to said tape and pivoting said drum second portion by 180°.

5. The system in accordance with claim 1 further comprising at least one sound head and one erasure head adapted to shift their relative position with respect to said tape along with said video head.

* * * * *

UNITED STATES PATENT AND TRADEMARK OFFICE
CERTIFICATE OF CORRECTION

PATENT NO. : 4,274,118
DATED : June 16, 1981
INVENTOR(S) : Hans Mangold

It is certified that error appears in the above-identified patent and that said Letters Patent are hereby corrected as shown below:

Column 2, line 45, "recored" should read -- recorded --.

Column 3, line 44, (Claim 1) "1.1" should read --1.--.

Signed and Sealed this

Twentieth Day of October 1981

[SEAL]

Attest:

GERALD J. MOSSINGHOFF

*Attesting Officer*  *Commissioner of Patents and Trademarks*